United States Patent
Lee et al.

(10) Patent No.: US 7,693,119 B2
(45) Date of Patent: Apr. 6, 2010

(54) TRANSMISSION POWER CONTROL OVER A WIRELESS AD-HOC NETWORK

(75) Inventors: Yan Lam Raymond Lee, Hong Kong (CN); Jun Chen, Hong Kong (CN); Yul Ming Tsang, Hong Kong (CN)

(73) Assignee: Hong Kong Applied Science and Technology Research Institute Co., Ltd., Hong Kong (CN)

( * ) Notice: Subject to any disclaimer, the term of this patent is extended or adjusted under 35 U.S.C. 154(b) by 1073 days.

(21) Appl. No.: 11/298,081

(22) Filed: Dec. 9, 2005

(65) Prior Publication Data

US 2007/0133483 A1 Jun. 14, 2007

(51) Int. Cl.
*H04W 4/00* (2006.01)

(52) U.S. Cl. .............. 370/338; 455/13.4; 455/522; 455/574; 455/127.1; 455/127.5

(58) Field of Classification Search .......... 370/338; 455/13.4, 522, 574, 127.1, 127.5
See application file for complete search history.

(56) References Cited

U.S. PATENT DOCUMENTS

| 6,594,468 | B1 |   | 7/2003 | Ramanathan |           |
|-----------|----|---|--------|------------|-----------|
| 6,711,409 | B1 |   | 3/2004 | Zavgren, Jr. et al. | |
| 6,735,448 | B1 |   | 5/2004 | Krishnamurthy et al. | |
| 7,035,221 | B2 | * | 4/2006 | Furukawa et al. | 370/238 |
| 7,245,947 | B2 | * | 7/2007 | Salokannel et al. | 455/574 |
| 7,286,844 | B1 | * | 10/2007 | Redi et al. | 455/522 |
| 7,383,038 | B2 | * | 6/2008 | Koenck et al. | 455/418 |
| 2002/0024935 | A1 | * | 2/2002 | Furukawa et al. | 370/238 |
| 2002/0090979 | A1 | * | 7/2002 | Sydor | 455/562 |
| 2003/0174690 | A1 | * | 9/2003 | Benveniste | 370/350 |
| 2003/0189906 | A1 | * | 10/2003 | Belcea | 370/318 |
| 2003/0203742 | A1 |   | 10/2003 | D'Souza et al. | |
| 2004/0180652 | A1 |   | 9/2004 | Jang et al. | |
| 2005/0059420 | A1 | * | 3/2005 | Salokannel et al. | 455/522 |
| 2005/0096074 | A1 | * | 5/2005 | Nanda et al. | 455/522 |
| 2005/0175026 | A1 | * | 8/2005 | Ayyagari | 370/443 |
| 2005/0176455 | A1 | * | 8/2005 | Krishnan et al. | 455/522 |

(Continued)

FOREIGN PATENT DOCUMENTS

CN       1692611 A      11/2005

(Continued)

OTHER PUBLICATIONS

Kwon et al., "Clustering with Power Control," UCLA, 1999 IEEE.

(Continued)

*Primary Examiner*—Joseph H Feild
*Assistant Examiner*—Huy D Nguyen
(74) *Attorney, Agent, or Firm*—Fulbright & Jaworski L.L.P.

(57) ABSTRACT

A method for controlling transmission power on a node over a wireless ad-hoc network which includes a plurality of sender, intermediate and receiver nodes is provided. Initially, levels of the transmission power of the node are configured. The node then exchange information with its neighboring nodes by sending out a global signal. After exchanging the information, the node identifies a node coverage for the level of the transmission power. The node then determines an effective transmission power (ETP). Finally, the ETP is used to form a virtual cluster.

16 Claims, 8 Drawing Sheets

U.S. PATENT DOCUMENTS

| | | | |
|---|---|---|---|
| 2005/0265305 A1* | 12/2005 | Furukawa et al. | 370/349 |
| 2005/0286440 A1* | 12/2005 | Strutt et al. | 370/253 |
| 2005/0286458 A1* | 12/2005 | Furukawa et al. | 370/315 |
| 2006/0114867 A1* | 6/2006 | Du et al. | 370/338 |
| 2006/0121906 A1* | 6/2006 | Stephens et al. | 455/446 |
| 2007/0274280 A1* | 11/2007 | Haas et al. | 370/348 |

FOREIGN PATENT DOCUMENTS

| | | |
|---|---|---|
| JP | 2004336782 A | 11/2004 |
| WO | WO 2004/079919 A2 | 9/2004 |

OTHER PUBLICATIONS

Gerla et al., "Multicluster, Mobile, Multimedia Radio Nework," *Wireless Networks* 1 (1995), pp. 255-265.

Turgut et al., "Optimizing Clustering Algorithm in Mobile Ad Hoc Networks Using Simulated Annealing," 2003 IEEE, pp. 1492-1497.

International Search Report dated Apr. 5, 2007 for PCT/CN2006/003322 in 4 pages.

Muqattash et al., "A Distributed Transmission Power Control Protocol for Mobile Ad Hoc Networks," The University of Arizona, pp. 1-19, IEEE Transactions on Mobile Computing, vol. 3, Issue 2, 2004.

Manousakis et al., "Clustering for Transmission Range Control and Connectivity Assurance for Self Configured Ad Hoc Networks," The University of Maryland College Park, pp. 1-6, Military Communications Conference, 2003, MILCOM 2003, IEEE, vol. 2, pp. 1042-1047 vol. 2.

Narayanaswamy et al., "Power Control in Ad-Hoc Networks: Theory, Architecture, Algorithm and Implementation of the COMPOW Protocol," University of Illinois; Proc. European Wireless 2002, Next Generation Wireless Networks: Technologies, Protocols, Services and Applications, pp. 156-162, Feb. 2002.

Yu et al., "Power-Stepped Protocol: Enhancing Spatial Utilization in a Clustered Mobile Ad Hoc Network," 2004 IEEE, IEEE Journal on Selected Areas in Communication, 2004, vol. 22, Part 7, pp. 1322-1334.

Kawadia et al., "Principles and Protocols for Power Control in Wireless Ad Hoc Networks," IEEE Journal on Selected Areas in Communications: Special Issues on Wireless Ad Hoc Networks, pp. 1-12, 2005, vol. 23, Issue 1 pp. 76-88.

* cited by examiner

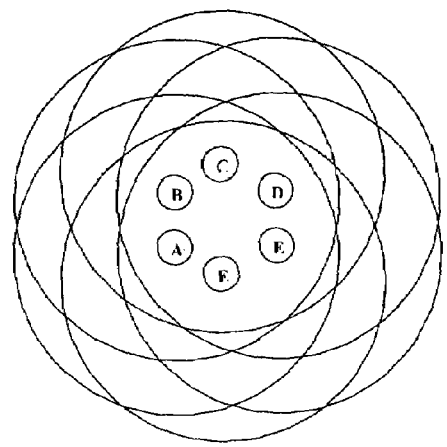
Figure 2
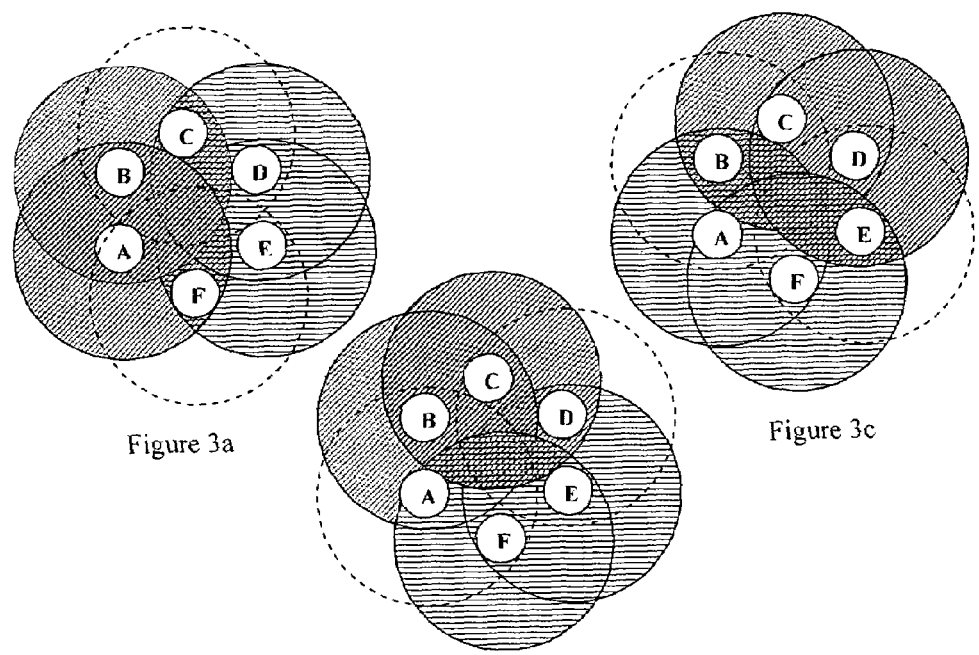
Figure 3a
Figure 3b
Figure 3c

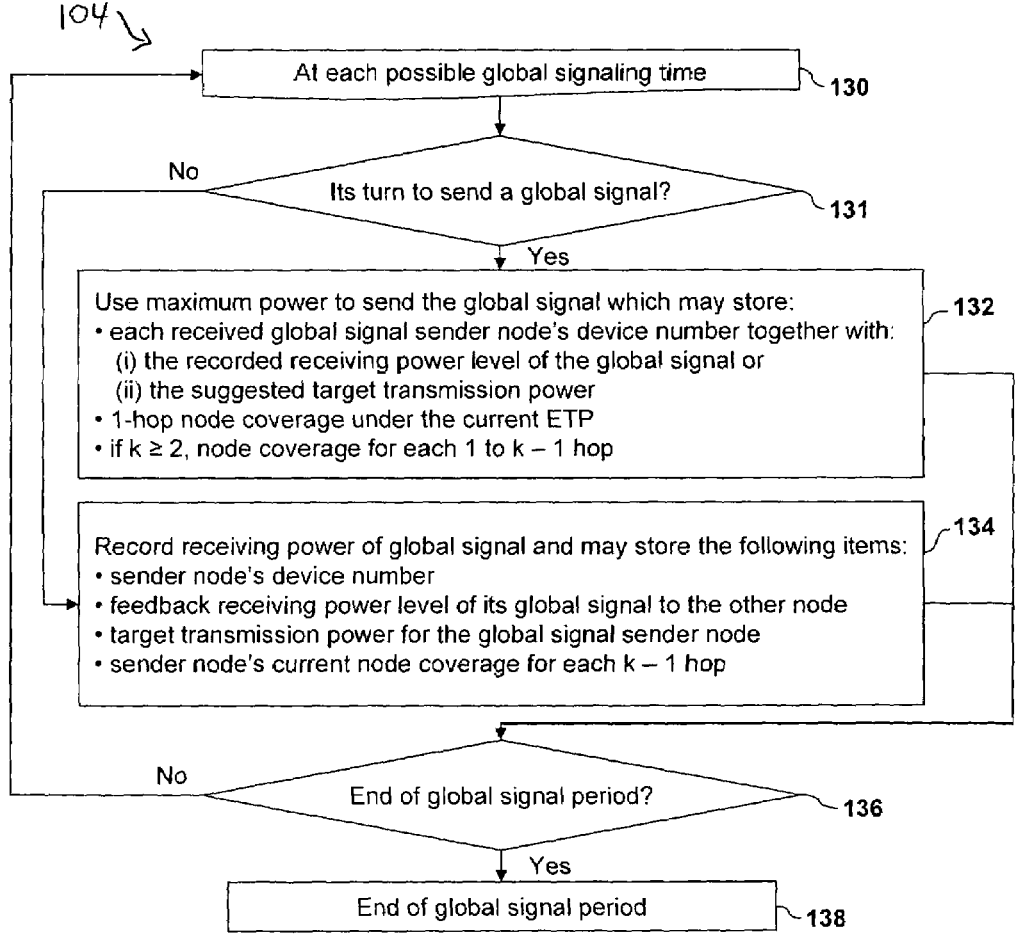

TRANSMISSION POWER CONTROL OVER A WIRELESS AD-HOC NETWORK

FIELD OF THE INVENTION

The present invention relates generally to wireless communication. More particularly, the present invention relates to transmission power control over a wireless ad-hoc network.

BACKGROUND

Wireless communication between mobile nodes has become increasingly popular. There are essentially two techniques used for linking nodes in wireless networks. The first technique uses existing cellular networks, which are essentially systems of repeaters wherein the transmitting or originating node contacts a repeater and the repeater retransmits the signal to allow for reception at the destination node. The obvious drawbacks to the cellular systems include significant infrastructure costs and geographic limitations. Because of the significant infrastructure costs it is not practical to have cellular networks in all areas. Furthermore, in times of emergency, such as earthquake, fire, or power interruption the cellular network can become disabled in the precise location where it is needed most.

The second technique for linking nodes is to form a wireless ad-hoc network among all users within a limited geographical region. The wireless ad-hoc network generally includes a collection of mobile nodes that communicate with each other using radio frequency links. These nodes communicate through shared spectrum and access the medium in a distributed manner. Each user participating in the ad-hoc network should be capable of, and willing to, forward data packets and participate in ascertaining if the packet was delivered from the original source to the final destination. The wireless ad-hoc network has a number of advantages over cellular networks. First, the wireless ad-hoc network is more robust, in that it does not depend on a single node, but rather has a number of redundant, fault tolerant, nodes, each of which can replace or augment its nearest neighbor. Additionally, the ad-hoc network can change position and shape in real time.

Many wireless ad-hoc network systems support both distributed contention-based channel access protocol (a protocol in which each node competes for accessing the channel in order to perform data transmission) and distributed reservation-based channel access protocol (a protocol in which each node reserves the time for accessing the channel in order to perform data transmission). For instance, in the Multi-Band Orthogonal frequency division multiplexing (OFDM) Alliance (MBOA) MAC specification, a prioritized channel access (PCA) is used as the contention-based channel access protocol. In PCA, a node utilizes both request-to-send (RTS) and clear-to-send (CTS) control signals to access the medium. Other than PCA, a distributed time slot reservation MAC scheme referred as distributed reservation protocol (DRP) is used as the reservation-based channel access protocol. With the DRP, the time is initially divided into superframes. The superframe is further divided into a number of time slots. The first few time slots are used as a beacon period, while the rest of the time slots are used as a data period. As a result, in the distributed reservation-based channel access protocol, each node in the network sends out a beacon during the beacon period to announce the slot reservation. The conflict can therefore be avoided.

Since ad-hoc node operates on limited battery power, energy efficiency is one of the critical issues. Transmission power control (TPC) is one of the important ways for saving energy. As used herein, the term "TPC" refers to the control of power for transmitting packets between nodes. In addition, if many nodes are crowd together within a small area, their communication ranges are overlapped with each other. Because of the range overlapping, only a small portion of nodes can communicate at a given time. As a result, network congestion is generated. It is therefore desired to develop a TPC scheme that can reduce the communication range for some of the nodes by clustering the network in order to reduces mutual interference and increase spatial reuse and further to increase the spectrum efficiency and the network throughput.

Although many TPC clustering schemes have been proposed for wireless ad-hoc network, many schemes are mainly focusing on the contention-based channel access protocol, but not on the reservation-based channel access protocol. Therefore, there is a need to develop a TPC clustering scheme that can support both of the channel access protocols, i.e., the contention-based channel access protocol and the reservation-based channel access protocol.

SUMMARY

A novel distributed power control scheme supporting both distributed contention-based channel access protocol and distributed reservation-base channel access protocol is provided. In order to increase spatial reuse, virtual clusters in the whole network are formed. The term "virtual" as used herein indicates that there is no definitive cluster. The term "virtual cluster" as used herein means that cluster is dynamically formed when all nodes in one group are not within the transmission range of any node in the other group.

As a distributed scheme is more robust and easy to install than a centralized scheme, each cluster does not have a central control unit. Instead, all nodes maintain different effective transmission power (ETP) based on certain conditions. As used herein, the term "ETP" refers to the bounded transmission power level of a sender node. By reducing the strength of ETP, the interference between nodes can be reduced. As a result, when two nodes cannot hear from each other by sending signal or data at ETP, they can transmit or receive data simultaneously.

In one aspect, a method for controlling transmission power on a node over a wireless ad-hoc network which includes a plurality of sender, intermediate and receiver nodes is provided. Initially, levels of the transmission power of the node are configured. The node then exchanges information with its neighboring nodes by sending out a global signal. After exchanging the information, the node identifies a node coverage for the level of the transmission power. The node then determines an ETP. Finally, the ETP is used to form a virtual cluster.

BRIEF DESCRIPTION OF THE DRAWINGS

FIG. 2 shows the transmission range when all nodes use the maximum transmission power.

FIGS. 3*a*-3*c* show the transmission range when all nodes reduce their transmission power to ETP.

FIG. 4 is a flowchart showing the steps of configuration on transmission power level, which is step 102 of FIG. 1.

FIG. 5 is a flowchart showing the steps of exchange of information between neighboring nodes, which is step 104 of FIG. 1.

DETAILED DESCRIPTION OF CERTAIN EMBODIMENTS

Reference is now made in detail to certain embodiments of the invention, examples of which are also provided in the following description. Exemplary embodiments of the invention are described in detail, although it will be apparent to those skilled in the relevant art that some features that are not particularly important to an understanding of the embodiments may not be shown for the sake of clarity.

Furthermore, it should be understood that the invention is not limited to the precise embodiments described below and that various changes and modifications thereof may be effected by one skilled in the art without departing from the spirit or scope of the invention. For example, elements and/or features of different illustrative embodiments may be combined with each other and/or substituted for each other within the scope of this disclosure and appended claims.

The method for transmission power control described hereinbelow is intended to be used in a wireless ad-hoc network, where each node can transmit or receive a signal to or from other nodes. Each node may send out a beacon or global signal periodically to exchange signal and control information. It is to be understood that the application is also suitable for any mobile ad hoc networks that support a beacon like periodic global signal. As used herein, the term "global signal" refers to a signal that is targeted to all nodes within its transmission range. Preferably, the global signal is sent out by a node using maximum transmission power level. The term "transmission power level" refers to the power strength of a sender node to send out signal or data. The term "maximum transmission power" refers to the maximum power strength of a sender node to send out signal or data.

Figure 1:
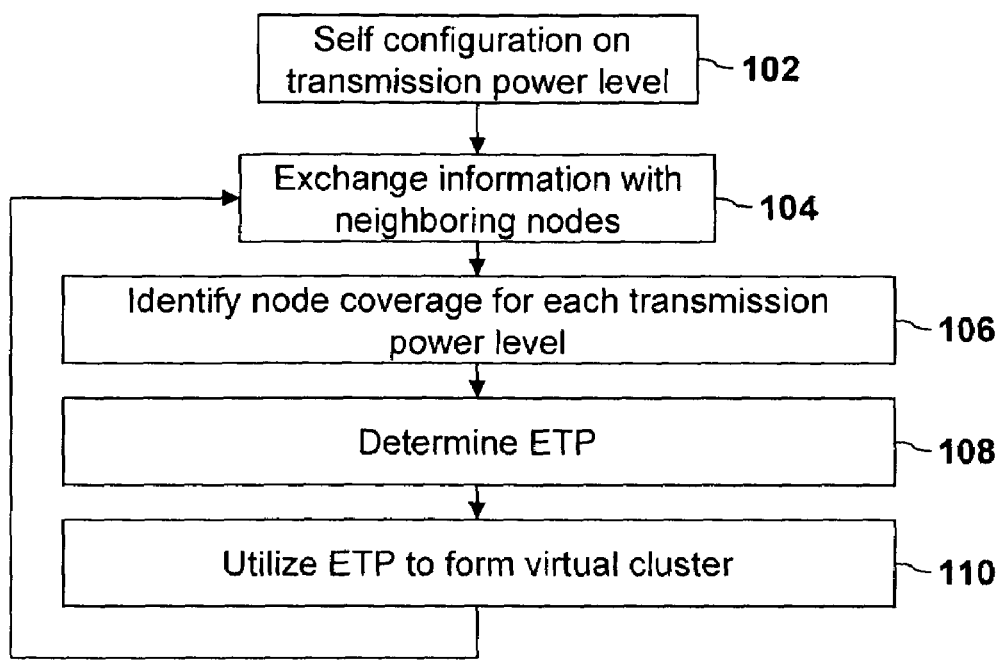
FIG. 1 is a flowchart showing major steps for controlling transmission power over a wireless ad-hoc network.

Referring now to FIG. 1, the steps for controlling transmission power over a wireless ad-hoc network are illustrated. The first step 102 is a stage of self-configuration on the transmission power level. In this step, each node in the network can initially divide the transmission power into one or more levels (i.e., n levels). The parameter n can be any number depending on the preference of the system in choosing the step size for each level of modification in transmission power. The higher the level, the higher the power strength would be. A node at the highest transmission power level can use the maximum power for transmission, while a node at the lowest transmission power level can use the minimum transmission power. In addition to dividing the transmission power into n levels, each node can also define the desired receiving power level on the receiver node.

After the configuration on the n levels of transmission power, each node can exchange information with its neighboring nodes by sending out a global signal as shown in step 104. As used herein, the term "neighboring node" refers to a node that can be reached by the sender node using current transmission power level. At this stage, each receiver node can record the receiving power of the global signal. When those receiver nodes send out their global signals, they can also indicate the receiving power of the previous picked up global signals or the target transmission power for each global signal sender node that they detected previously. Therefore, by checking the global signal on other nodes, the node can understand at what level its global signal is arriving to each of its neighboring nodes. In addition to exchanging information on receiving power or target transmission power, each node can also maintain node coverage information for each of the k hop neighboring nodes. As used herein, "k hop" refers to a path from a source node to a destination node with (k-1) intermediate nodes therebetween. k represents the number of intermediate nodes plus 1 or the number of total nodes (including the source node and the destination node) minus 1. The "intermediate node" refers to a node that passes along the traffic to assist the traffic path from the source node to the destination node. Nodes which are covered under ETP are considered as 1 hop neighboring nodes. As used herein, "1 hop" represents a path from a source node to reach a destination node without the need of intermediate node. Through the 1 hop neighboring nodes, a node can pick up 2 hop to k hop neighboring nodes information. Accordingly, the method for maintaining updated node coverage information for each node is that each node passes the information of each of its (k-1) hop neighboring nodes to the neighboring nodes. As a result, all nodes obtain the information on k hop neighboring nodes. At the initial stage, each node may only have less than (k-1) hop neighboring nodes information for passing to other nodes. However, as more nodes propagate their node coverage information to their surrounding nodes, each node can quickly form the picture of its k hop neighboring nodes. It then can send out its (k-1) hop neighboring nodes information to its surrounding nodes.

Referring to step 106, after exchanging the information, each node can identify the node coverage for each transmission power level. With the exchanged information, a node is able to determine the target transmission power for each of its neighboring nodes. The node can then map each of its neighboring nodes into one of the transmission power levels. As a result, the node coverage can be determined for each transmission power level.

Referring to step 108, after determining the node coverage for each transmission power level, each node is able to internally determine the level of transmission power that it can reach at all its original connected nodes within k hop of distance. As used herein, the term "original connected nodes" are referred as nodes that are covered under maximum transmission power. Accordingly, at the beginning, a node can start to identify the topology at transmission power level one. The node can then form the picture on all its 1 hop neighboring nodes within the current transmission power level. Next, the node is able to determine whether it can reach all its original connected nodes within k hop of distance through the 1 hop neighboring nodes. If not, it can move up to the next higher transmission power level to include more 1 hop neighboring nodes. Once the node finds out that it can reach all its original connected nodes within k hop of distance through the 1 hop neighboring nodes and it does not form any asymmetric link with another node, it can stop at the current transmission power level. As used herein, the term "asymmetric link" refers to a communication link between two nodes in which the first node's packet can reach the second node, but the second node's packet cannot reach the first node. The current transmission power level is referred as the ETP for the node. The node can then use the ETP as its bounded transmission. Thus, each node can use the maximum transmission power to send out global signal and use ETP to send out control signal and data.

Therefore, by reducing the transmission power for each node to the ETP, the interference between two nodes can be reduced. Nodes that can transmit and receive packets from each other can form a group. As a result, when all nodes in one group are not within the transmission range of any node in the other group, these two groups of nodes can access the channel simultaneously. Since each group virtually forms its network for communication, the group is referred as a virtual cluster. This stage is shown in step 110. Thereafter, the node can wait for the next period to exchange information with neighboring nodes and repeat the processes specified in step 104 to step 110.

Referring to FIG. 2 in which all nodes are crowded together, if all nodes use the maximum transmission power to transmit signal or data, a single signal or data transmission between a pair of nodes will already affect all the surrounding nodes. Therefore, only one pair of nodes can communicate at a time. However, if all nodes reduce their transmission power to ETP, as shown in FIGS. 3*a*-3*c*, the transmission range of one node will no longer cover all the surrounding nodes. Thus, it is possible for more than one pair of nodes to communicate at the same time. Three virtual cluster sets are shown in FIGS. 3*a*-3*c* when all nodes reduce their transmission power to ETP. In FIG. 3*a*, after reducing the transmission power, the transmission range for node A and node B will no longer cover node D and node E. On the other hand, the transmission range for node D and node E will no longer cover node A and node B. Therefore, the communication between node A and node B and the communication between node D and node E can take place at the same time. A virtual cluster is then formed for {(A, B) and (D, E)}. Similarly, in FIG. 3*b*, a virtual cluster is formed for {(B, C) and (E, F)}, and in FIG. 3*c*, a virtual cluster is formed for {(C, D) and (A, F)}.

Configuration on Transmission Power Level

Configuration on transmission power level (step 102 of FIG. 1) is the initial stage of the process for controlling transmission power over a wireless ad-hoc network. The details of this stage are shown in FIG. 4.

In this stage, each node can configure all n levels of transmission power with respect to a reference transmission power level as shown in step 120. In addition, as shown in step 122, each node can also configure the desired receiving power for receiving the packet. The desired receiving power defined by a user can be used in the later stage for the mapping between the transmission power level and the corresponding receiving power in the neighboring node. Further, as shown in step 124, the node can optionally initialize ETP to the default initial value, which is 1 in the illustrated embodiment.

Information Exchange between Neighboring Nodes

Information exchange between neighboring nodes (step 104 of FIG. 1) is the next stage of the process for controlling transmission power over a wireless ad-hoc network after the configuration on transmission power level (step 102 of FIG. 1). The details of this stage are shown in FIG. 5.

During the periodic global signaling cycle (which is referred to as the period between the first node to the last node for sending out the global signal), when the node receives a global signal from a neighboring node, it can record the receiving power of the global signal as shown in step 134. The node may store the neighboring node's identity (e.g., device number) and the neighboring node's current node coverage for each (k-1) hop in its memory. In addition, the node may also store the feedback receiving power of its global signal on the other node or the target transmission power suggested by the other node if the neighboring node has included the information in the global signal.

At each possible global signaling time (step 130), when it becomes the turn for the node to send a global signal as shown in step 131, the node then sends the global signal as shown in step 132. Preferably, the maximum transmission power can be used. The node may include the received global signal sender nodes' identity (e.g., device number) together with the recorded receiving power of their global signal or the suggested target transmission power for the global signal sender nodes. Moreover, the node may also include its 1 hop node coverage information under the current ETP. Initially, ETP can be set to 1 and be modified by the node following the procedure shown in FIG. 8 which will be discussed below. If the value of k is greater than or equal to 2, the node may include node coverage for each 1 to (k-1) hop. The above steps can be repeated until the end of the global signaling cycle as shown in steps 136 and 138.

1. Determination of Node Coverage for each Transmission Power Level

Figure 6:
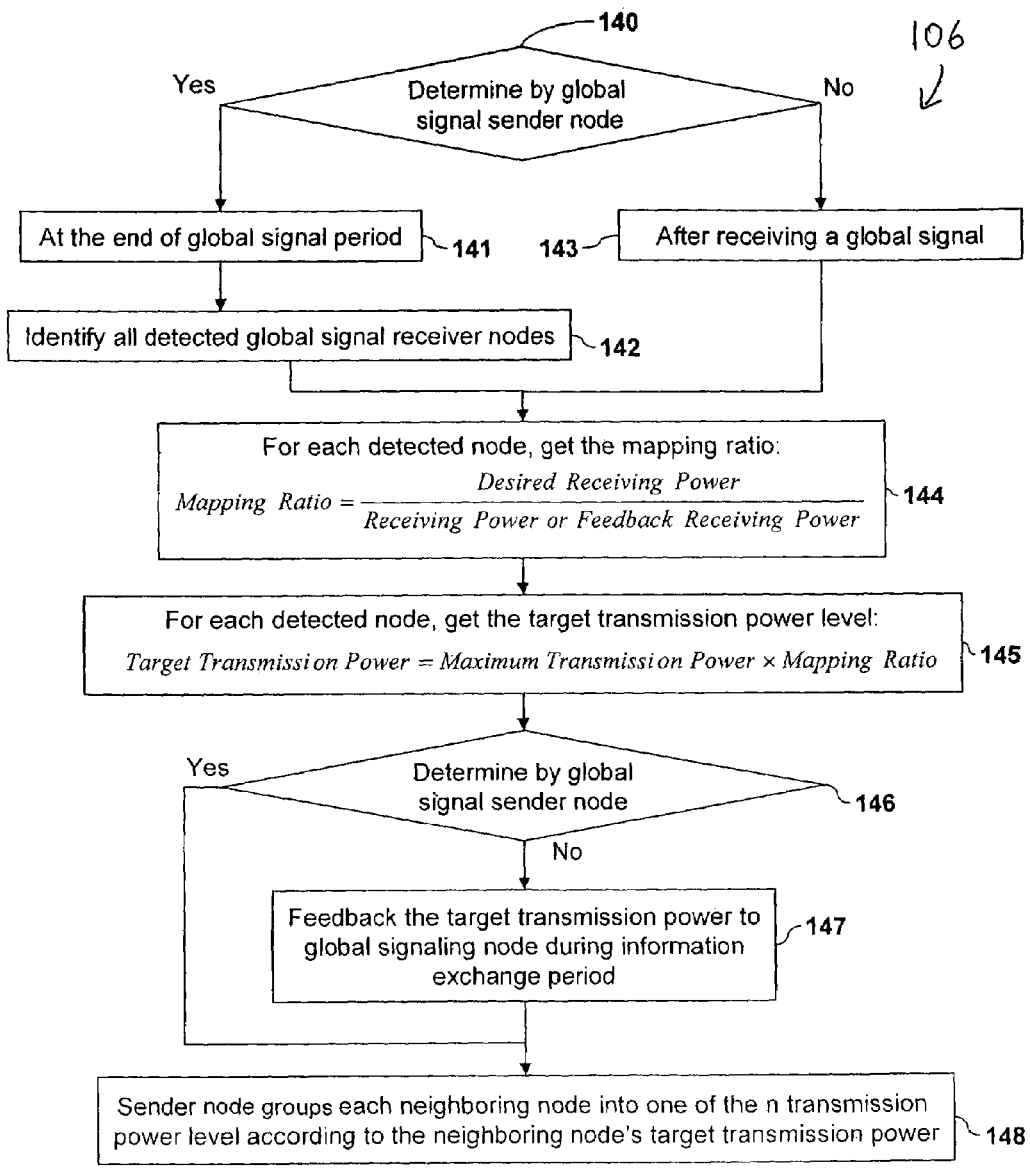
FIG. 6 is a flowchart showing the steps of determination of node coverage for each transmission power level, which is step 106 of FIG. 1.

Determination of node coverage for each transmission power level (step 106 of FIG. 1) is the next stage of the process for controlling transmission power over a wireless ad-hoc network after the information exchange between neighboring nodes (step 104 of FIG. 1). The details of this stage are shown in FIG. 6.

The target transmission power for a global signal sender node on its neighboring nodes can be calculated by either the global signal sender node or the global signal receiver node. If the target transmission power is determined by the global signal sender node as shown in step 140, preferably at the end of the global signaling cycle (step 141), each global signal sender node can utilize the relationship between the desired receiving power and the feedback receiving power of its global signal on each neighboring node to determine the target transmission power level for each neighboring node. Therefore, after identifying all detected global signal receiver nodes as shown in step 142, each global signal sender node may determine the mapping ratio (mapping ratio=desired receiving power/receiving power or feedback receiving power) for each of the global signal receiver nodes as shown in step 144. By using the mapping ratio, each global signal sender node can further determine the target transmission power level (target transmission power level=maximum transmission power×mapping ratio) for each of the global signal receiver nodes as shown in step 145. Lastly, if the target transmission power is determined by the global signal sender node as shown in step 146, the node can group each neighboring node into one of the n transmission power levels as shown in step 148.

Another option to determine the target transmission power level on the sender is for the global signal receiver node to determine the target transmission power for the global signal sender node after it receives a global signal as shown in step 140 and 143. The receiver node then runs the same process in step 144 and 145 by using the detected receiving power instead of feedback receiving power to determine the target transmission power for the global signal sender node. Since the target transmission power is determined by the global signal receiver node as shown in step 146, the receiver node returns the value back to the global signal sender node as shown in step 147 during the information exchanging period as specified in step 104 of FIG. 1. Once the global signal sender node receives the information, the node can group each neighboring node into one of the n transmission power levels as shown in step 148.

Figure 7:
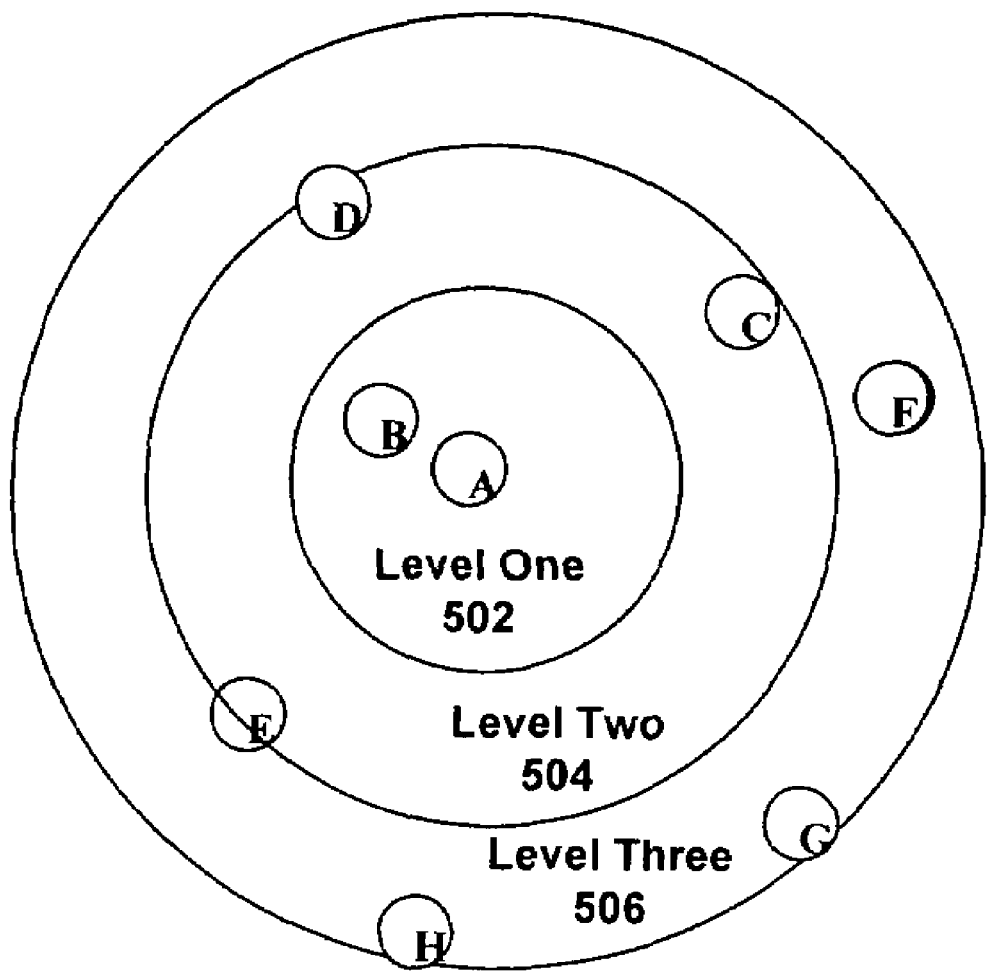
FIG. 7 shows exemplary node coverage for each transmission power level of a node.

For example, when the transmission power is divided into three levels with each power level represents a transmission range as shown in FIG. 7, with reference to node A, node B is covered under power level one 502; nodes C, D and E are covered under power level two 504; and nodes F, G and H are covered under power level three 506. Table 1 to Table 3 below show the total node coverage for each node at transmission power level one to level three, respectively. In each table, the first column shows the reference node and the second column indicates the current transmission power level of the reference node. The last set of columns shows which nodes will be covered by the reference node under the current transmission power level.

TABLE 1

| Node | Power Level | Nodes Coverage at Current Power Level |   |   |   |   |   |   |
|---|---|---|---|---|---|---|---|---|
| A: | 1 | B |   |   |   |   |   |   |
| B: | 1 | A |   |   |   |   |   |   |
| C: | 1 |   |   | F |   |   |   |   |
| D: | 1 |   |   |   |   |   |   |   |
| E: | 1 |   |   |   |   |   |   |   |
| F: | 1 |   | C |   |   |   |   |   |
| G: | 1 |   |   |   |   |   |   |   |
| H: | 1 |   |   |   |   |   |   |   |

TABLE 2

| Node | Power Level | Nodes Coverage at Current Power Level |   |   |   |   |   |   |
|---|---|---|---|---|---|---|---|---|
| A: | 2 |   | B | C | D | E |   |   |
| B: | 2 | A |   |   | D | E |   |   |
| C: | 2 | A |   |   |   |   | F |   |
| D: | 2 | A | B |   |   |   |   |   |
| E: | 2 | A | B |   |   |   |   | H |
| F: | 2 |   |   |   |   |   |   |   |
| G: | 2 |   |   |   |   |   |   |   |
| H: | 2 |   |   |   |   | E |   |   |

TABLE 3

| Node | Power Level | Nodes Coverage at Current Power Level |   |   |   |   |   |   |
|---|---|---|---|---|---|---|---|---|
| A: | 3 |   | B | C | D | E | F | G | H |
| B: | 3 | A |   | C | D | E |   |   |
| C: | 3 | A | B |   | D |   | F |   |
| D: | 3 | A | B | C |   |   |   |   |
| E: | 3 | A | B |   |   |   |   | H |
| F: | 3 | A |   | C |   |   |   | G |
| G: | 3 | A |   |   |   | F |   | H |
| H: | 3 | A |   |   | E |   | G |   |

Determination of the ETP

Figure 8:
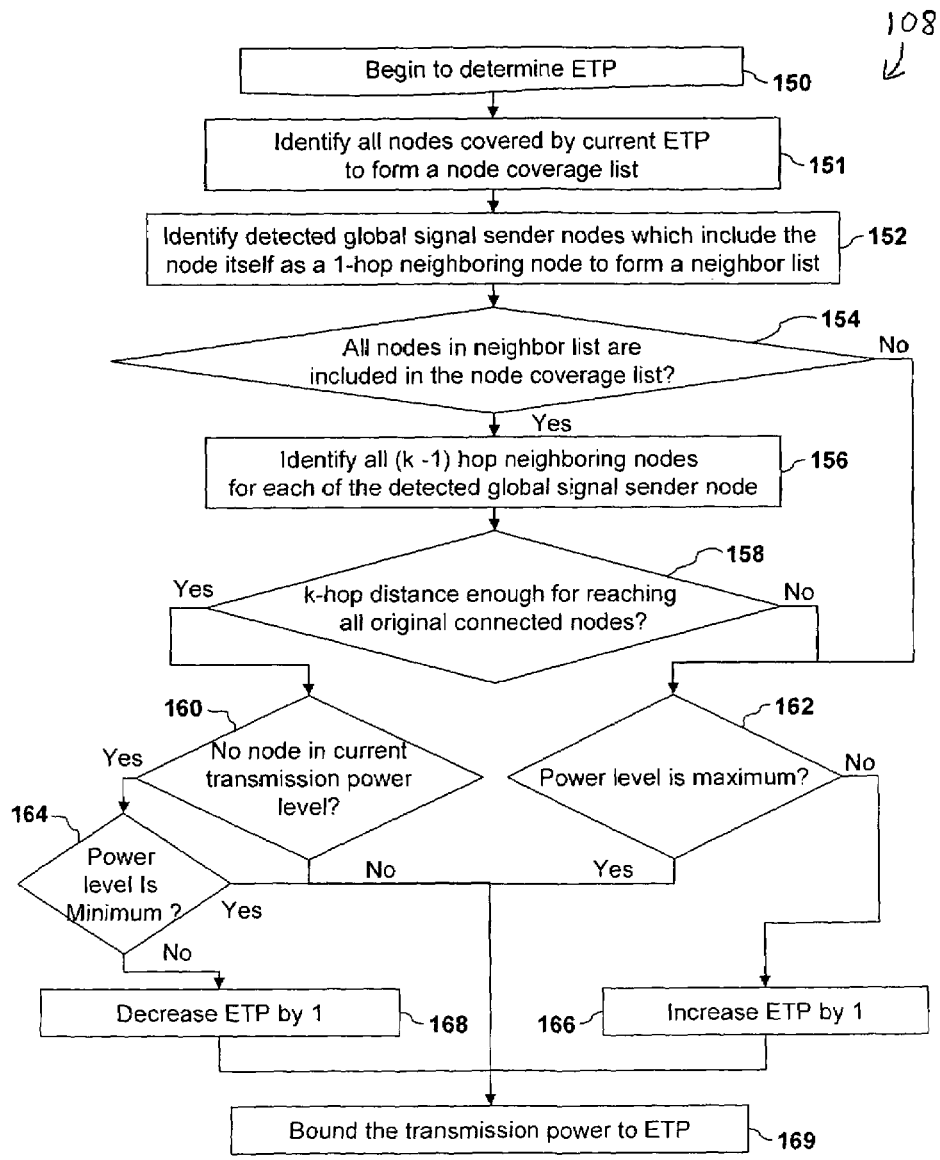
FIG. 8 is a flowchart showing the steps of determination of the ETP, which is step 108 of FIG. 1.

Determination of the ETP (step 108 of FIG. 1) is the next stage of the process for controlling transmission power over a wireless ad-hoc network following the determination of node coverage for each transmission power (step 106 of FIG. 1). After determining the value of ETP, each node can send out control signal or data at ETP and send out global signal at maximum transmission power level. The details of this stage are shown in FIG. 8.

After grouping the neighboring nodes, the node can identify all 1 hop neighboring nodes covered by the current ETP to form a node coverage list (step 151). The node can then identify each detected global signal sender nodes which have included the node itself as 1-hop neighboring node to form a neighbor list as shown in step 152. If the node discovers that the node coverage list does not cover all nodes in the neighbor list (step 154), it can try to increase its transmission power level in order to prevent asymmetric links. If the node is already using the maximum transmission power for transmission (step 162), the node can continue to bound the transmission power to ETP (step 169). Otherwise, as shown in steps 166 and 169, the node can increase one step on ETP. Thereafter, it can wait for the next global signaling cycle. However, if the current node coverage list covers all nodes in the neighbor list (step 154), the node can further identify the (k-1) hop neighboring nodes for each of the 1 hop neighboring nodes (step 156).

After collecting all the information, the node can determine whether the current ETP is large enough to cover all the original connected nodes, which are covered under the maximum transmission range. The decision can be based on whether the node can reach all the original connected nodes within k hop distance through its 1 hop neighboring nodes (step 158). If the current node coverage through all 1 hop neighboring nodes does not cover all the original connected nodes, the node can try to increase one step on the transmission power level as specified in steps 162 and 166. Otherwise, the node can check whether it can reduce the ETP. In particular, the node can check whether any node is still covered under the current transmission power level (step 160). If there is a node covered under the current transmission power level, the node can remain to use the current ETP (step 169). If no node is covered under the current transmission power level, the node can proceed to check whether the current transmission power level is at the minimum (step 164). If the transmission power is at the minimum level, the node does not modify ETP (step 169). Otherwise, the node can decrease one level on ETP to save power (step 168). The node can then bound the transmission power to ETP (step 169). Lastly, the node can go back to step 150 and wait for the next global signaling cycle.

Referring back to FIG. 7 and Table 4 below, the number of levels (i.e., n levels) can be set to 3, while the number of hops (k) can be set to 2. Nodes which can be reached through 2 hops are marked with asterisk (*). In each table, the first column shows the reference node, and the second column indicates the current transmission power level of the reference node. The third set of columns shows which nodes will be covered by the reference node under the current transmission power level. The last column shows the status on the reference node whether the current transmission power level is large enough to cover all the original connected nodes within k hops. Taking node A as an example, at the transmission power level one, node A can only reach node B. Therefore, node A has to repeat the process with the ETP set to level two. At the ETP with level two, as shown in Table 5, node A can now reach nodes B, C, D, and E directly. Moreover, node A can reach node F through node C in 2 hops and reach node H through node E in 2 hop. However, node A still cannot reach node G with the current ETP. On the other hand, nodes B, C, D, and E have already reached all their original connected nodes within 2 hops. Thus, nodes B, C, D, and E can bounds the transmission power to the current ETP. Finally, at ETP with level three, node A can reach all its original connected nodes in 2 hop as shown in Table 6.

TABLE 4

| Node | Power Level | First Run | | | Status |
|---|---|---|---|---|---|
| A: | 1 | B | | | |
| B: | 1 | A | | | |
| C: | 1 | | | F | |
| D: | 1 | | | | |
| E: | 1 | | | | |
| F: | 1 | | C | | |
| G: | 1 | | | | |
| H: | 1 | | | | |

TABLE 5

| Node | Power Level | Second Run | | | | | | Status |
|---|---|---|---|---|---|---|---|---|
| A: | 2 | B | C | D | E | F* | H* | |
| B: | 2 | A | C* | D | E | | | Complete |
| C: | 2 | A | B* | D* | F | | | Complete |
| D: | 2 | A | B | C* | | | | Complete |
| E: | 2 | A | B | | | | H | Complete |
| F: | 2 | A* | C | | | G | | |
| G: | 2 | A | | | F | | H | |
| H: | 2 | A* | | E | | G | | |

TABLE 6

| Node | Power Level | Third Run | | | | | | | Status |
|---|---|---|---|---|---|---|---|---|---|
| A: | 3 | B | C | D | E | F | G | H | Complete |
| B: | 2 | A | C* | D | E | | | | Complete |
| C: | 2 | A | B* | D* | F | | | | Complete |
| D: | 2 | A | B | C* | | | | | Complete |
| E: | 2 | A | B | | | | | H | Complete |
| F: | 3 | A | C | | | G | | | Complete |
| G: | 3 | A | | | F | | | H | Complete |
| H: | 3 | A | | E | | G | | | Complete |

Utilizing ETP to Form Virtual Cluster

Utilizing ETP to form a virtual cluster (step 110 of FIG. 1) is the next stage of the process for controlling transmission power over a wireless ad-hoc network after determining the effective transmission power (step 108 of FIG. 1). Below is a preferred implementation on how to utilize ETP to form virtual cluster with distributed contention-based channel access protocol and distributed reservation-based channel access protocol. The details of this stage are shown in FIGS. 9-12.

a. Virtual Cluster with Distributed Contention-Based Channel Access Protocol

Figure 9:
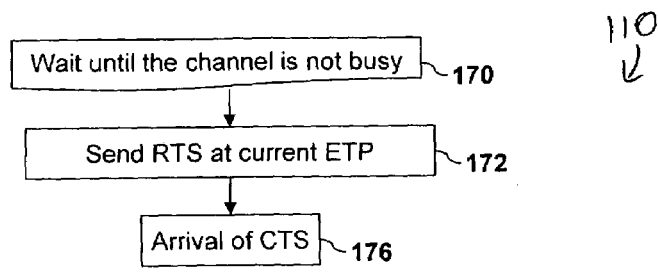
FIGS. 9 and 10 are flowcharts showing the steps of utilization of the ETP to form virtual cluster with distributed contention-based channel access protocol, which is step 110 of FIG. 1.

The ETP is used to improve spatial utilization over distributed contention-based channel access protocol. Referring now to FIG. 9, the sender node can initially determine whether the channel is busy or not. When the channel is not busy (step 170), the sender node can use a typical request-to-send (RTS) message to gain the right to access the channel. The purpose of the RTS message is to silent the neighboring nodes which are within the sender node's transmission range. To increase spatial utilization, the sender node can use the ETP instead of the maximum transmission power to send out the RTS message as shown in step 172. Since the transmission range for the RTS message is reduced, some pairs of nodes which can originally hear from each other do not pick up the RTS messages from the other nodes. Although different nodes may send the RTS messages at different power levels, asymmetric links to the network are not generated. The reason is that once a node discovers that a global signaling sender node is not within its 1 hop neighboring node coverage under the current ETP (step 154 of FIG. 8), it increases the ETP until it finds out the global signaling sender node is under its 1 hop neighboring node coverage. As a result, all other nodes which can affect the sender node can be within the transmission range of the sender node utilizing ETP. Therefore, when the node wants to clear the channel by sending the RTS messages at the ETP, it is sufficient to notify all the potential interferers.

A node that can pick up the RTS message from the sender node is able to become the member of the sender node's virtual cluster. Otherwise, the node can form another virtual cluster with other nodes. Therefore, it is possible for a pair of nodes to send out the RTS message at the same time. Once the sender node receives a typical clear-to-send (CTS) message from the receiver node, the sender node can begin to transmit data as shown in step 176 of FIG. 9.

Table 3 shows that if all nodes use the maximum transmission power to send the RTS message, node B and node C cannot access the channel at the same time since they can hear the RTS message from each other. In Table 6, both node B and node C use power level two to send out the RTS message and they do not interfere with each other.

Figure 10:
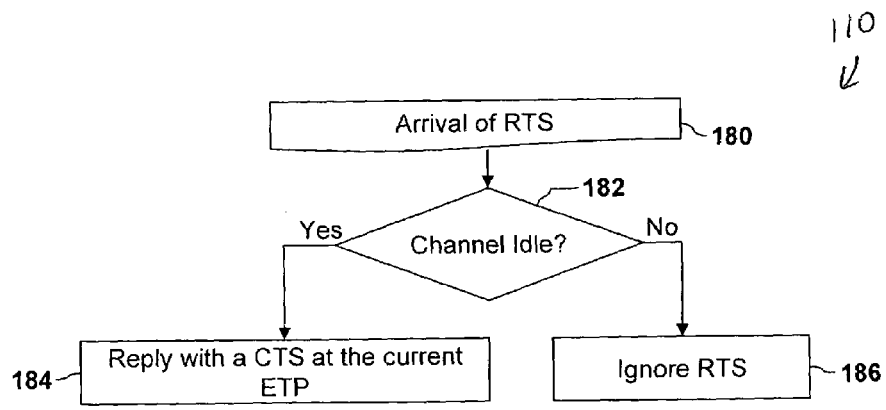

On the other hand, at the receiver side as shown in FIG. 10, after receiving the RTS message (step 180), a node can determine whether the channel is idle or not (step 182). If the channel is idle, the receiver node can reply with a CTS message at the ETP to the sender node as shown in step 184. Otherwise, the receiver node can ignore the RTS message as shown in step 186.

The receiver node can send out a CTS message at the ETP instead of the maximum transmission power level. Some pairs of nodes that can originally hear from each other do not pick up the CTS message from the other nodes. Therefore, it is possible for a pair of nodes to simultaneously use the CTS message to clear the zone for the transmission.

For instance, in Table 6, because node D does not interfere with nodes C and F, node D can reply a CTS message to node B. At the same time, since node F does not interfere with nodes B and D, it can reply a CTS message to node C as well. As a result, two virtual clusters can be formed. The first virtual cluster can contain nodes B and D, while the second virtual cluster can contain nodes C and F.

b. Virtual Cluster with Distributed Reservation-Based Channel Access Protocol

The node coverage information is also used to improve the spatial utilization over distributed reservation-based channel access protocol. The periodic global signal can be used to indicate the reservation node coverage for a node.

Figure 11:
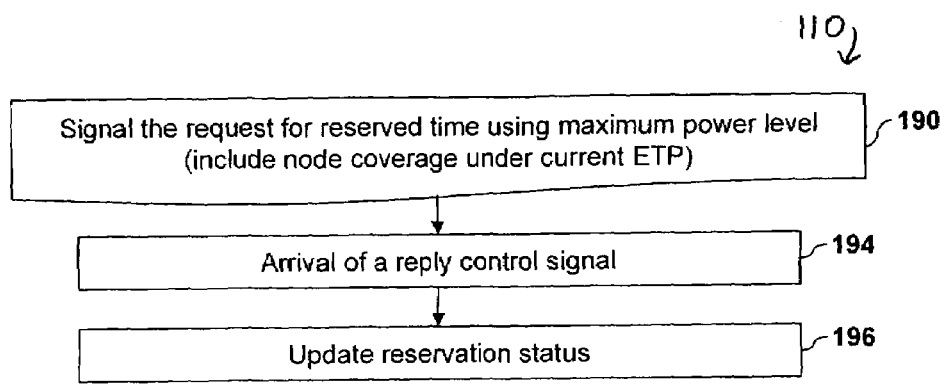
FIGS. 11 and 12 are flowcharts showing the steps of utilization of the ETP to form virtual cluster with distributed reservation-based channel access protocol, which is step 110 of FIG. 1.

Referring to FIG. 11, at the sender node, it not only can include time slots reservation information but also can include 1 hop node coverage information under the current ETP in the global signal (step 190). Since the global signal is sending at the maximum transmission power level, nodes that are outside the transmission range of utilizing ETP but within the maximum transmission range of the sender node can still receive the beacon. Once the sender node receives a reply message from the receiver node (step 194), it can check whether the reservation is successful or not and update the reservation status (step 196).

Figure 12:
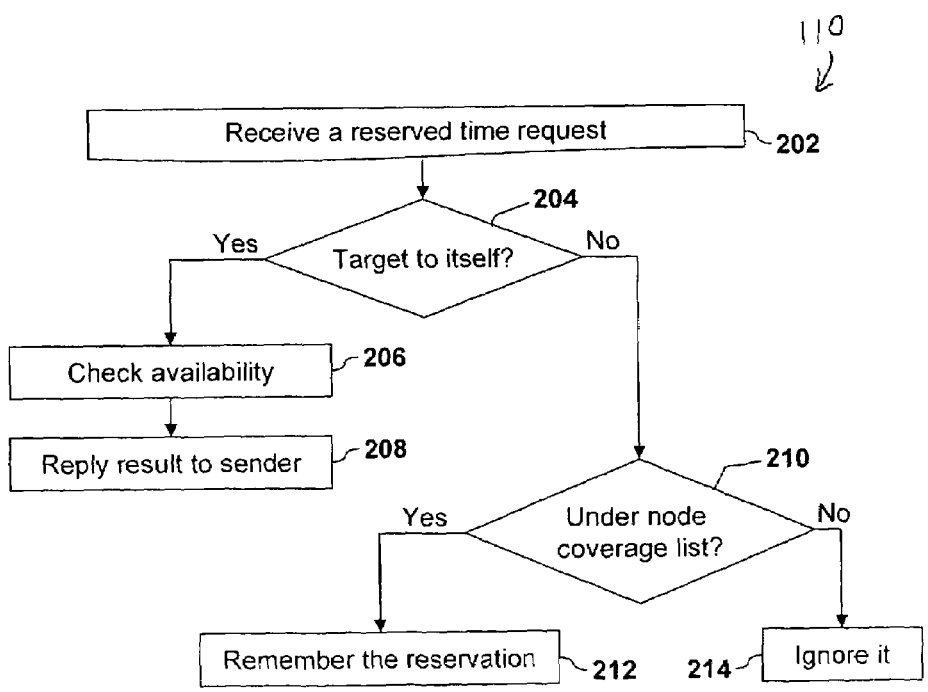

At the receiver side, as shown in FIG. 12, after receiving a global signal with time slots reservation from a sender node (step 202), a receiver node can initially check whether the global signal is targeted to itself (step 204). If the global signal is targeted to itself, it can check its availability for the time slots reservation as specified in step 206. After checking the availability, the receiver node can reply the result to the sender node as specified in step 208. On the other hand, if the global signal is not targeted to itself, it can check whether its own ID is contained in the 1 hop node coverage list specified in the global signal (step 210). If the receiver node's ID is on the list, it can remember the sender node's time slot reservation (step 212). Otherwise, it can ignore the global signal message as shown in step 214. By ignoring the message, the receiver node would not be within the sender node's transmission range utilizing ETP. Therefore, the receiver node does not block out the time slot based on the request by the sender node.

Without the present system, a receiver node would not know that the sender node has reduced the size of the transmission range. The receiver node would then remember the current time slot reservation and block out the specified time slot for future reservation if the present system were not applied.

Adding and Removing Nodes

When a new node is added to the network, the new node can repeat the procedure described in FIGS. 4-6 and FIG. 8 to determine its ETP.

When a node leaves the network, all nodes can try to reduce their ETP as specified in step 160 of FIG. 8. If the leaving node is the last node existing in a node's current transmission power level, the node is able to decrease one step on the transmission power level.

Interference between Nodes

To further reduce the effect of interference between nodes, the value of the ETP can be set differently. In order to maintain a certain value of signal-to-noise ratio, the distance between the sender node and the receiver node must be closer than the distance between the interfering node and the receiver node. The rule-of-thumb is to first understand the channel model of the system. From the channel model, find out the relationship between the power of distance represented by X, and the receiving power. By using the predefined SNR value and X, ETP can be set to a value equal to $(SNR)^{1/X}$ times the original ETP. In this case, it can ensure that the node can clear the channel within the range coverage by the ETP. In addition, it can also ensure that the current ETP is large enough for maintaining a certain value of signal-to-noise ratio when the interfering nodes are outside of the range coverage by using ETP.

Although the present invention has been described with reference to preferred embodiments, workers skilled in the art will recognize that changes may be made in form and detail without departing from the spirit and scope of the invention. In addition, the embodiments are not to be taken as limited to all of the details thereof as modifications and variations thereof may be made without departing from the spirit or scope of the invention.

We claim:

1. A method for controlling transmission power on a node over a wireless ad-hoc network which includes a plurality of sender, intermediate and receiver nodes, the method comprising:
    (A) configuring transmission power levels of the node;
    (B) exchanging information with neighboring nodes by sending out a global signal;
    (C) identifying a node coverage for each of the transmission power levels;
    (D) determining effective transmission power (ETP); and
    (E) utilizing the ETP to form a virtual cluster, wherein step (B) comprises:
    (a) determining if it is the turn for the node to send the global signal at each possible global signaling time;
    (b) recording the receiving power of the global signal as recorded receiving power if it is not the turn for the node to send the global signal;
    (c) sending the global signal if it is the turn for the node to send the global signal;
    (d) determining whether a cycle of the global signal is ended; and
    (e) repeating the steps of (a)-(d) if the cycle of the global signal is not ended.

2. The method of claim 1 wherein step (A) comprises:
    (a) configuring the transmission power levels of the node with respect to a reference transmission power level; and
    (b) configuring desired receiving power for receiving a signal.

3. The method of claim 1 wherein step (b) comprises storing an identification of one of the neighboring nodes and a current node coverage for each (k-1) hop of the neighboring node.

4. The method of claim 3 wherein step (b) comprises storing feedback receiving power of the global signal on the other node or target transmission power suggested by the other node if the information is included in the global signal from the neighboring node.

5. The method of claim 1 wherein step (c) comprises sending the global signal using maximum transmission power.

6. The method of claim 1 wherein step (c) comprises storing an identification of a received global signal sender node together with the recorded receiving power of the global signal or suggested target transmission power in the global signal.

7. The method of claim 6 wherein step (c) comprises storing a 1 hop node coverage under the ETP or node coverage for each 1 to (k-1) hop if k is greater than or equal to 2 in the global signal.

8. The method of claim 1 wherein step (C) comprises mapping each of the neighboring nodes into one of the transmission power levels.

9. The method of claim 8 wherein mapping each of the neighboring nodes into one of the transmission power levels is based on relationship between a receiving power level on each of the neighboring nodes and a desired receiving power level.

10. The method of claim 1 wherein step (D) comprises:
    (a) identifying all nodes covered by the ETP to form a node coverage list;
    (b) identifying detected global signal sender nodes which include the node itself as a 1-hop neighboring node to form a neighbor list;
    (c) determining whether the node coverage list covers all the nodes in the neighbor list;
    (d) identifying (k-1) hop neighboring nodes for each of the 1 hop neighboring nodes if the node coverage list covers all the nodes in the neighbor list; and
    (e) determining whether all originally connected nodes are reached through the 1 hop neighboring nodes within a k hop distance.

11. The method of claim 10 wherein step (D) comprises:
    (a) determining whether a maximum transmission power level is used if all the originally connected nodes are not reached through the 1 hop neighboring nodes within the k hop distance;
    (b) increasing one level on the ETP if the maximum transmission power level is not used; and
    (c) bounding the transmission power to the ETP.

12. The method of claim 10 wherein step (D) comprises:
    (a) determining whether one of the originally connected nodes is covered under the transmission power level if all of the originally connected nodes are reached through the 1 hop neighboring nodes within the k hop distance;
(b) determining whether the transmission power level reaches minimum if the originally connected nodes are not covered under the transmission power level;
(c) decreasing one level on the ETP if the transmission power level does not reach minimum; and
(d) bounding the transmission power to the ETP.

13. The method of claim 1 wherein step (D) comprises:
(a) identifying all nodes covered by the ETP to form a node coverage list;
(b) identifying detected global signal sender nodes which include the node itself as a 1-hop neighboring node to form a neighbor list;
(c) determining whether the node coverage list covers all nodes in the neighbor list;
(d) determining whether a maximum transmission power level is used if the node coverage list does not cover all the nodes in the neighbor list;
(e) increasing one level on the ETP if the maximum transmission power level is not used; and
(f) bounding the transmission power to the ETP.

14. A method for controlling transmission power on a node over a wireless ad-hoc network which includes a plurality of sender, intermediate and receiver nodes, the method comprising:
(A) configuring transmission power levels of the node;
(B) exchanging information with neighboring nodes by sending out a global signal;
(C) identifying a node coverage for each of the transmission power levels;
(D) determining effective transmission power (ETP); and
(E) utilizing the ETP to form a virtual cluster, wherein step (C) comprises mapping each of the neighboring nodes into one of the transmission power levels, wherein mapping each of the neighboring nodes into one of the transmission power levels comprises:
(a) determining whether a global signal sender node or a global signal receiver node is responsible for determining target transmission power;
(b) identifying detected global signal receiver nodes if the target transmission power is determined by the global signal sender node;
(c) determining a mapping ratio for each of the detected global signal receiver nodes;
(d) obtaining a target transmission power level for each of the detected global signal receiver nodes using the mapping ratio; and
(e) grouping each of the neighboring nodes into the transmission power levels according to the target transmission power level.

15. A method for controlling transmission power on a node over a wireless ad-hoc network which includes a plurality of sender, intermediate and receiver nodes, the method comprising:
(A) configuring transmission power levels of the node;
(B) exchanging information with neighboring nodes by sending out a global signal;
(C) identifying a node coverage for each of the transmission power levels;
(D) determining effective transmission power (ETP); and
(E) utilizing the ETP to form a virtual cluster, wherein step (C) comprises mapping each of the neighboring nodes into one of the transmission power levels, wherein mapping each of the neighboring nodes into one of the transmission power levels comprises:
(a) determining whether a global signal sender node or a global signal receiver node is responsible for determining target transmission power;
(b) determining a mapping ratio for each detected global signal sender node after receiving a global signal if the target transmission power is determined by the global signal receiver node;
(c) obtaining a target transmission power level for the detected global signal sender node using the mapping ratio;
(d) feeding back the target transmission power to the detected global signal sender node; and
(e) grouping each of the neighboring nodes into the transmission power levels according to the target transmission power level.

16. A method for controlling transmission power on a node over a wireless ad-hoc network which includes a plurality of sender, intermediate and receiver nodes, the method comprising:
(A) configuring transmission power levels of the node;
(B) exchanging information with neighboring nodes by sending out a global signal;
(C) identifying a node coverage for each of the transmission power levels;
(D) determining effective transmission power (ETP); and
(E) utilizing the ETP to form a virtual cluster, wherein the virtual cluster uses a distributed reservation-based channel access protocol and wherein at the sender node step (E) comprises:
(a) sending a request for reserved time using the global signal which includes the node coverage under the ETP;
(b) receiving a reply signal from the receiver node;
(c) checking whether a reservation of time is successful; and
(d) updating status of the reservation of time, wherein at the receiver node step (E) comprises:
(e) receiving the global signal with the reserved time from the sender node;
(f) checking whether the global signal is targeted to the receiver node;
(g) checking whether an identification of the receiver node is contained in a node coverage list specified in the global signal if the global signal is not targeted to the receiver node;
(h) remembering the reserved time of the sender node if the identification of the receiver node is in the node coverage list;
(i) ignoring the global signal if the identification of the receiver node is not in the node coverage list; and
(j) checking availability for the reserved time and replying to the sender node if the global signal is targeted to the receiver node.

* * * * *

UNITED STATES PATENT AND TRADEMARK OFFICE
CERTIFICATE OF CORRECTION

| | | |
|---|---|---|
| PATENT NO. | : 7,693,119 B2 | Page 1 of 1 |
| APPLICATION NO. | : 11/298081 | |
| DATED | : April 6, 2010 | |
| INVENTOR(S) | : Yan L. Lee et al. | |

It is certified that error appears in the above-identified patent and that said Letters Patent is hereby corrected as shown below:

On the cover page, item [75] inventor's name (left hand column), delete "Yul Ming Tsang" and replace with --Yui Ming Tsang--.

Signed and Sealed this

Twenty-second Day of June, 2010

David J. Kappos
*Director of the United States Patent and Trademark Office*